United States Patent
Maloizel

(10) Patent No.: US 6,462,514 B2
(45) Date of Patent: Oct. 8, 2002

(54) BATTERY UNIT WITH AN INTEGRAL CHARGE CONTROLLER

(75) Inventor: Serge Maloizel, Trois Palis (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/879,102

(22) Filed: Jun. 13, 2001

(65) Prior Publication Data

US 2002/0063551 A1 May 30, 2002

(30) Foreign Application Priority Data

Nov. 27, 2000 (FR) .............................................. 00 15264

(51) Int. Cl.$^7$ ................................................. H02J 7/00
(52) U.S. Cl. ...................................... 320/139; 320/150
(58) Field of Search ............................... 320/112, 132, 320/136, 150, 164; 324/427; 429/7, 53

(56) References Cited

U.S. PATENT DOCUMENTS

| | | | | |
|---|---|---|---|---|
| 5,684,382 A | * | 11/1997 | Fritz et al. ................... | 320/164 |
| 5,976,720 A | * | 11/1999 | St. Jean et al. ................ | 429/7 |
| 6,074,775 A | * | 6/2000 | Gartstein et al. ............. | 429/53 |
| 6,107,802 A | * | 8/2000 | Matthews et al. ........... | 324/427 |
| 6,118,248 A | * | 9/2000 | Gartstein et al. ........... | 320/136 |
| 6,163,131 A | * | 12/2000 | Gartstein et al. ........... | 320/136 |
| 6,198,250 B1 | * | 3/2001 | Gartstein et al. ........... | 320/112 |
| 6,286,109 B1 | * | 9/2001 | Pirdy ........................ | 320/150 |

* cited by examiner

Primary Examiner—Gregory J. Toatley, Jr.
Assistant Examiner—Pia Tibbits
(74) Attorney, Agent, or Firm—Sughrue Mion, PLLC

(57) ABSTRACT

The battery unit includes a storage battery (AC) with an integral charge control circuit (CC). The charge control circuit (CC) includes a switch (S) adapted to prevent or allow charging current (Ic) to flow into the storage battery (AC), said switch (S) being controlled by a measuring system for measuring at least one physical parameter (T1, Tn, Vb) representative of the state of the storage battery (AC) in order to command successive opening and closing of the switch (S) to chop said charging current (Ic) if said measured physical parameter crosses a predetermined threshold The end of charging of the storage battery is then optimized by the battery unit itself, so that a simple constant current generator is sufficient to charge the storage battery satisfactorily.

5 Claims, 1 Drawing Sheet

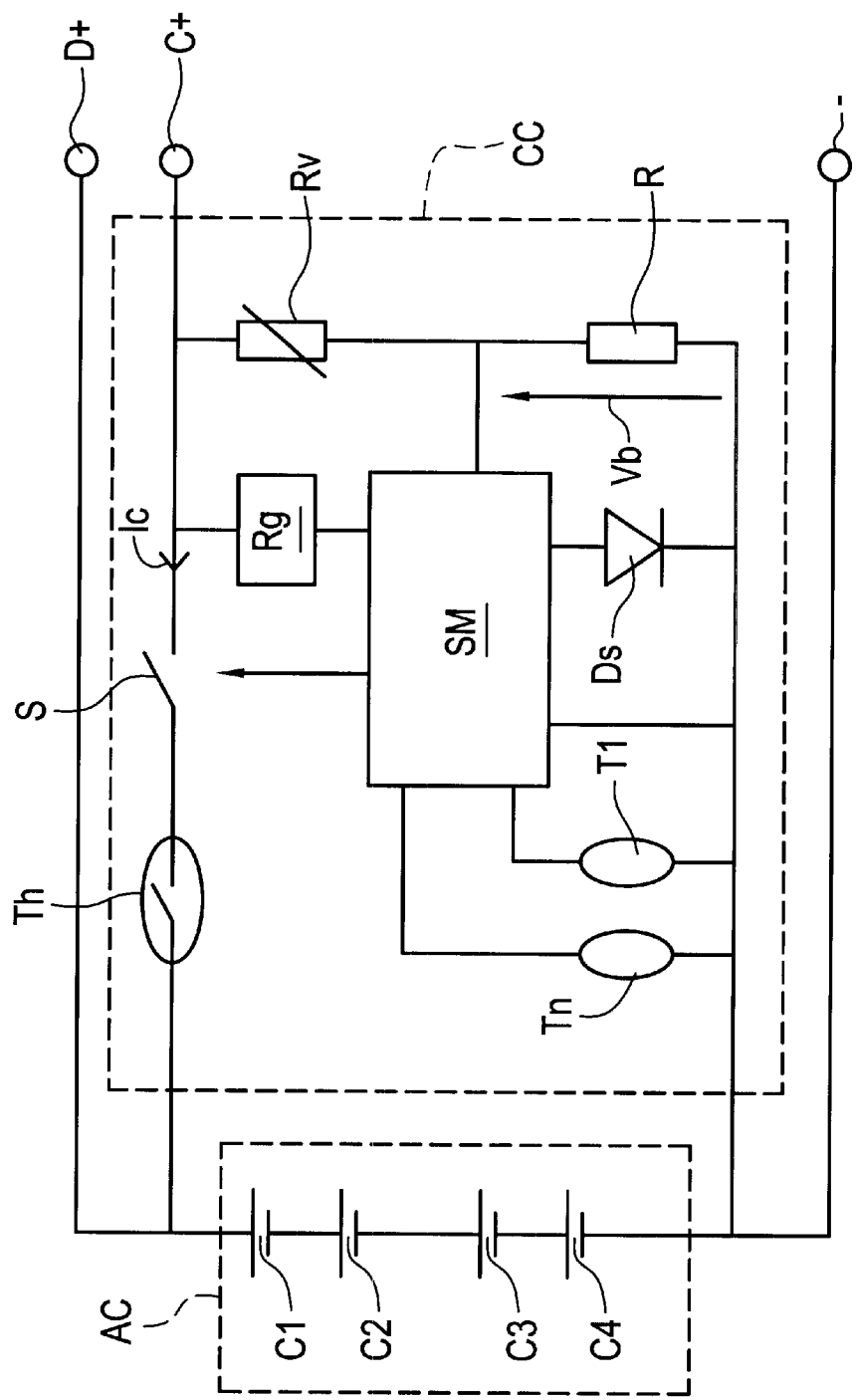
FIGURE

BATTERY UNIT WITH AN INTEGRAL CHARGE CONTROLLER

The invention relates to a battery unit including a storage battery with an integral charge control circuit.

The invention applies more particularly to alkaline battery units intended to be charged at a constant current, for example battery units including one or more nickel-cadmium storage cells.

With this kind of storage battery, progressively reducing the charge current at the end of charging significantly increases the service life of the battery unit. To obtain this kind of charging profile, it is conventional to use an external charger designed for the storage battery concerned, that is to say able to detect an end of charge state in order to initiate a progressive reduction in the charging current that it generates. This kind of charger is therefore dependent on the characteristics of the associated battery unit, which increases its cost of manufacture and reduces its flexibility.

U.S. Pat. No. 5,557,188 discloses a regulator that can evaluate the state of charge of the associated storage battery by storing data such as the current entering the storage battery, the current leaving the storage battery, the temperature and a set of parameters specific to the battery unit. The regulator can also communicate with an external system, in particular so that it can be controlled by the external system, for example to carry out a fast charge or a slow charge. This kind of regulator has a high manufacturing cost, which is viable in some particular applications, such as supplying power to a portable computer, but proves to be unsatisfactory in simpler applications, for example supplying power to a mobile telephone.

The object of the invention is to remedy the aforementioned drawbacks by proposing a charge control circuit that is sufficiently simple to be integrated into a battery unit at low additional cost.

To this end, the invention provides a battery unit including a storage battery with an integral charge control circuit, characterized in that the charge control circuit includes a switch adapted to prevent or allow charging current to flow into the storage battery, said switch being controlled by a measuring system for measuring at least one physical parameter representative of the state of the storage battery in order to command successive opening and closing of the switch to chop said charging current if said measured physical parameter crosses a predetermined threshold.

The battery unit is then able itself to manage the current that flows through the storage battery in order to optimize the charging conditions without requiring a dedicated charger.

In one preferred embodiment of the invention, if said predetermined threshold is crossed, the measuring system commands the switch to chop the charging current with a first duty cycle during a predetermined time interval to homogenize the charge of the storage battery and then with a second duty cycle less than the first duty cycle to establish a trickle current for compensating self-discharge of the storage battery. The battery unit is then in an optimum state of charge as long as it is connected to a charger.

In another particular embodiment of the invention, the measuring system includes a voltage divider bridge and one physical parameter representative of the state of the storage battery is a voltage of the storage battery. The battery unit is then better able to evaluate the state of the storage battery, for more refined detection of an end of charge state.

In a further particular embodiment, the battery unit includes a thermostat between said switch and said storage battery to prevent a charging current from entering the storage battery if the temperature of the storage battery increases and the measuring system fails. The battery unit according to the invention is then made safe in the event of failure of the measuring system that it includes.

The invention will now be described in more detail, and with reference to the accompanying drawing, which shows one embodiment of the invention by way of non-limiting example.

The single figure is a diagrammatic representation of a battery unit according to the invention.

The battery unit according to the invention shown in the single figure includes an integral control circuit CC which is connected to the terminals of a storage battery AC. The storage battery AC comprises four cells C1, C2, C3, C4 connected in series, but the invention applies to any association of cells conventionally used in the field of storage batteries.

The battery unit according to the invention has a negative terminal "−", a positive discharge terminal D+ and a charge terminal C+; a charger is connected to the terminals C+ and "−" and a receiver is connected to the terminals D+ and "−". To be more specific, the terminals D+ and "−" are connected directly to the poles of the storage battery and the charge terminal C+ is connected to the storage battery AC via the control circuit CC. The control circuit CC includes a switch S adapted to prevent or allow a charge current Ic to flow from the charge terminal C+ to the storage battery AC.

The switch S is controlled by a measuring system SM included in the control circuit; the measuring system is therefore able to command successive opening and closing of the switch S to chop a charge current Ic applied to the battery unit by a charger. It is therefore possible to chop a current Ic applied to the charge terminal C+ by a charger to reduce the average value of the current flowing through the storage battery in order to follow a charging profile specific to the storage battery. The measuring system SM is connected to the charge terminal C+ by a regulator circuit Rg which supplies a constant voltage to it and to the negative terminal "−". The control circuit CC includes a voltage divider bridge consisting of two resistors R and Rv connected in series between the terminal C+ and the terminal "−" so that a voltage Vb appearing between the resistors R and Rv is proportional to the voltage of the storage cell AC. The measuring system connected to the resistors R and Rv is therefore able to read off the storage battery voltage, in order to chop the charging current as soon as that voltage crosses a predetermined threshold value. The resistor Rv is a variable resistor which adjusts the division factor of the divider bridge to suit the storage battery. The threshold value is pre-stored in the measuring system SM, which can be a microcontroller, for example, including a memory system and one or more analog/digital converters for reading information supplied by sensors to which it is connected, like the voltage Vb previously cited.

The system SM is therefore able to measure one or more physical parameters representative of the state of charge of the storage battery AC in order to command chopping of the charging current if one of the physical parameters crosses a predefined threshold. The physical parameters can be the voltage of the storage battery, as described above, or temperatures, as described below.

The measuring system SM can instead be programmed so that the current is chopped in two successive stages if one of the physical parameters crosses a threshold. During a predetermined time interval, the current is chopped with a first duty cycle to encourage homogenization of the charge in the storage battery, after which the current is chopped with a second duty cycle, lower than the first, to produce a trickle current for compensating self-discharge of the storage battery. To be more precise, using a lower current than the nominal charging current during the aforementioned predetermined time interval balances the charges in the various cells of an alkaline storage battery. In this embodiment the charge in the storage battery is homogenized and the storage battery remains at an optimum level of charge as long as it is connected to a charger.

To evaluate the state of charge of the storage battery, the measuring system SM can be connected to temperature sensors T1, Tn, as shown in the figure, in order to acquire the temperature of the storage battery at various points therein. Thus the system SM can measure several physical parameters characteristic of the state of the storage battery, such as temperatures and temperature variations deduced from information supplied by each sensor.

To be more specific, the measuring system can be programmed to calculate the temperature variation value dT/dt for each sensor T1, Tn, the temperature for each sensor, and the voltage of the storage battery AC, and to test these values continuously in order to trigger chopping of the charging current as soon as any of these values crosses an associated threshold.

For safety reasons, there is provision for fitting a thermostat Th between the switch S and the storage battery AC to prevent any charging current Ic from entering the storage battery AC if the temperature of the storage battery increases and the measuring system SM fails. The control circuit of the battery unit according to the invention further includes an indicator Ds for indicating the state of charge, and in particular either that charging is in progress or that the battery unit is charged.

What is claimed is:

1. A battery unit comprising a storage battery coupled to an integral charge control circuit, the charge control circuit comprising a switch adapted to prevent or allow a charging current to flow into the storage battery, said switch being controlled by a measuring system that measures at least one physical parameter representative of a state of the storage battery in order to command successive opening and closing of the switch to chop said charging current if said measured physical parameter exceeds a predetermined threshold, wherein, if said predetermined threshold is exceeded, the measuring system commands the switch to chop the charging current with a first duty cycle during a predetermined time interval to homogenize the charge of the storage battery, and then to chop the charging current with a second duty cycle having a length less than a length of the first duty cycle, to establish a trickle current that compensates self-discharge of the storage battery.

2. The battery unit according to claim 1, wherein the measuring system is coupled to a voltage divider bridge and receives a physical parameter representative of the state of the storage battery, said parameter comprising a voltage of the storage battery received from said voltage divider bridge.

3. The battery unit according to claim 1, wherein the measuring system is coupled to one or more temperature sensors and a physical parameter representative of the state of the storage battery is a temperature of the storage battery.

4. The battery unit according to claim 3, wherein said physical parameter representative of the state of the storage battery is a variation in time of the temperature of the storage battery.

5. The battery unit according to claim 1, further comprising a thermostat coupled between said switch and said storage battery operative to prevent a charging current from entering the storage battery if a temperature of the storage battery increases and the measuring system fails.

* * * * *